INVENTORS
JAMES L. SMITH
DONALD W. WILLEN
BY
ATTORNEY

United States Patent Office 3,432,656
Patented Mar. 11, 1969

3,432,656
GAGE DEVICE FOR MEASUREMENT OF
DENSITY PROFILES OF SNOWPACK
James L. Smith, Pleasant Hill, and Donald W. Willen, Berkeley, Calif., assignors to the United States of America as represented by the United States Atomic Energy Commission
Filed Nov. 25, 1966, Ser. No. 597,150
U.S. Cl. 250—43.5                                               10 Claims
Int. Cl. G01t *1/16;* G01n *23/08*

ABSTRACT OF THE DISCLOSURE

The gage device of the invention disclosed herein comprises probe means including a radioisotope gamma radiation source and a gamma radiation detector arranged for continuous simultaneous movement along transversely spaced parallel pathways provided in a solid moisture containing deposit. The source and detector are proportioned in such a manner that a portion of the gamma radiation from said source directly traverses successive narrowly defined volume portions of said deposit so that the intensity of said direct transmission gamma radiation is a measure of the density of moisture in said volume portion. Means are provided for discriminating against indirectly transmitted radiation, for determining the intensity of directly transmitted radiation and for continuously plotting intensity variations correlatively with the changing position of said probe in said deposit as a measure of the moisture distribution therein.

---

The invention described herein was made in the course of, or under a contract with the United States Atomic Energy Commission.

The invention relates in general to the measurement of moisture content in solid deposits, and more particularly to a device for measuring water content, density distribution and depth characteristics of snowfall and snowpacks.

Snow deposits range from the low density unpacked condition of fresh snowfall to the dense, hardpacked gelated condition of glacier ice. Deposits of particular interest in hydrology, weather study, etc., are usually those ranging from fresh snowfall to the packed condition which may be termed "snowpack." The water content of at least upper interface portions of soil beneath such a snowpack is also often of interest. The accumulation of water in the form of snowpacks has long been recognized of vast economic importance since power generation, domestic and agricultural water supplies, flood conditions and the like are dependent thereon.

In the past, snow surveying methods have been principally concerned with the gross amount of water accumulated in the snowpack. The classical method of snow survey, originated by Dr. James E. Church, utilizes a hollow cylinder of known dimension which is forced through the snowpack, of gauged depth, to obtain a sample which is weighed to determine the water content and density of the snowpack. A large number of determinations at widely scattered locations is required to provide gross snow cover moisture content on a regional basis.

With the advent of radioisotopes, some progress has heretofore been made toward utilizing radiation, attenuation or scattering phenomena to provide similar information on over-all water content and unlocalized density characteristics of snowpacks. Two distinct types of devices have been developed. In one, a radioisotope radiation source using, e.g., radiozinc, Sr-90, Co-60 or other radio-isotope, is suspended above the snow with a radiation detection system, e.g., a scintillator detector, Geiger counter, etc., beneath the snow. Such a system can measure overall water content up to certain maximum depth, i.e., water equivalent depths, and is generally subject to count variations due to temperature changes. Moreover, relatively large sources containing, e.g., 30–80 millicuries of Co-60 are required, presenting a possibility of hazardous radiation exposures to personnel in the vicinity. Neutrons from compact Po—Be, Ra—Be, etc. sources back scattered, e.g., by water in glaciers, can be measured with radiation detectors to indicate the amount of water in a spherical volume. However, the spherical volume zone of influence varies with ice density, e.g., from 8 to 16 inches, above and below the detector, and no precise localized indication of density variation can be obtained with such devices. Moreover, tedious time-consuming calibrations and multiple measurements performed manually are required with such procedures.

While the methods of the prior art can, with the expenditure of considerable effort, yield information as to the overall water content of a snowpack, none can provide information as to the distribution of the water in or the behavior of the snowpack progressively with time. To study such behavior in detail, there has existed a long-felt need of a method for measuring depth, snow structure and characteristics of the snowpack undisturbed in place—throughout the snowpack over a long period of time. The time-to-time variations, e.g., day-to-day or even hour-by-hour changes in the snowpack conditions can provide indications of runoff to be expected, or even quite early warning of catastrophic melting induced by undue warming, heavy rainfall, snowpack ripening or the like. Heretofore, warning of impending flood conditions was obtained from stream gauges which indicate rising stream levels. Only a few hours forewarning is thereby obtained, while information as to the snowpack conditions and behavior could give warning much more in advance of stream rise. Also, stream rise is not reliable, since normal fluctuations occur over a considerable range of volume and such data are not necessarily closely correlative to the condition of the snowpack.

The present invention provides a gage device including a radioisotope radiation source and radiation detector arranged to traverse a snowpack at any selected site so as to determine the density and variations in density correlative with water content as a continuous measure throughout the depth of the snowpack. Mechanical actuators which can be operated remotely, as well as the provision of a graphical chart representation of the density profile and/or an output signal suitable for transmission by telemetry allows for remote or observed operation as desired. Accordingly, relatively short time variations of snowpack properties, e.g., density, water content, water content distribution, depth and the like are made possible.

Accordingly, it is an object of the invention to provide a gage device for rapidly and easily determining the water content distribution profile of a snow deposit; to provide a device for determining water content and density of undisturbed snowpack correlative with depth; to provide a device capable of remote operation for determining the water content distribution of a snowpack; and to provide a device adapted for graphical representation or to provide an output signal suitable for telemetry communication to a central observation post.

Other objects and advantages of the invention will be apparent by consideration of the following description and accompanying drawing, wherein:

FIGURE 1 is a schematic illustration of a first embodiment of gage apparatus in accordance with the invention, while FIGURE 1A is an enlarged view of the probe assembly shown in FIGURE 1;

FIGURE 2 is an illustration of a second embodiment of gage apparatus in accordance with the invention;

In brief, gage apparatus of the invention for measuring moisture content densities of snowpacks and adjacent soil structures comprises a radioisotope source disposed in spaced fixed relation to a radiation detector cooperating with electronic circuitry to preferentially detect and count gamma or X-ray radiation traveling along a narrow direct incremental path therebetween, and to discriminate against radiation, generally degraded in energy, traveling along indirect paths therebetween. The detector and source are arranged preferably in an assembly, e.g., with the detector and radioisotope source disposed as probes in spaced parallel wells in a solid moisture-containing deposit, e.g., snow deposit, so that both may be moved simultaneously therein. Radiation from the radioisotope source accordingly traverses a narrow path or incremental segment of defined width, area and length through the section of snowpack to be surveyed to impinge on said detector to yield a count rate which is an accurate indication of the amount of water interposed in said path. For most effective operation, the apparatus is further provided with means for moving said assembly at selected constant rates of travel whereby said path of defined dimension or increment progressively traverses the section of snow to be surveyed. A continuous chart recording apparatus can then be used to indicate the water content distribution profile as described hereinafter.

Figure 1:
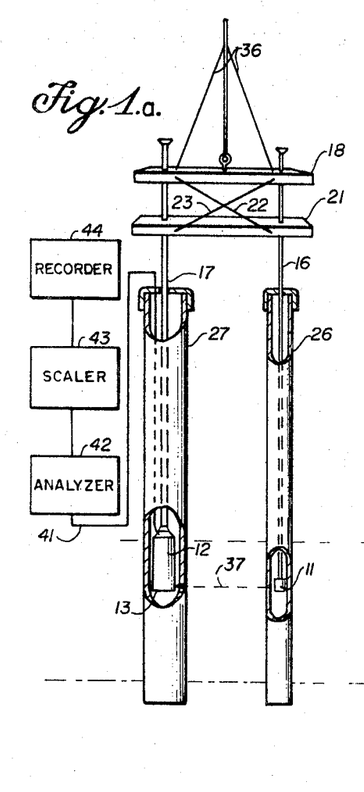

More particularly, as shown in FIGURE 1 of the drawing, in gage apparatus of the invention there is used a radioisotope device which emits energetic gamma (or X-ray) radiation, preferably monoenergetic, from a relatively concentrated, i.e., a quasipoint, source. For detection of the transmitted radiation, there is employed a sensitive radiation detector 12, for example a scintillation detector assembly utilizing a thallium-activated sodium iodide crystal or other gamma radiation detector constructed to present a narrowly defined area of counting acceptance for radiation from said source. A scintillation crystal of 0.5 inch thickness with adequate width, e.g., 1.5 inch circular diameter, disposed with the edge facing said source, would provide a width of 0.5 inch effective for counting radiation directly traversing a path of about 0.5 inch width from said source. A thicker crystal would accept radiation traversing a wider path and thereby reduce resolution, while a thinner crystal would provide somewhat better resolution, but require slower traversing speeds. As in conventional practice, the scintalator crystal (not shown) is disposed horizontally in the lower portion of a cylindrical tubular housing 13, together with a photomultiplier and associated electronic amplifier circuitry in upper portions thereof to constitute such a detector 12.

With the sensitivity of such a scintillator, the 5 millicurie Cs-137 source and detector can be separated by 1 or even 2 or 3 feet or more, center to center, without reducing traversing speed seriously, i.e., below 1 ft./min., or sacrificing counting accuracy. For a 1-foot separation, about 4 cubic inches of snow is in the direct path traversed by the desired gamma photons using sources and detector crystals of the size indicated above. With a Geiger-Mueller tube, e.g., with a 2-inch counting window giving about 2-inch wide increments, a spacing of about 1 foot maximum can be used, but with a decrease in resolution. Geiger-Mueller tubes of the pancake variety can discriminate against lower energy gamma, e.g., below 200 kev., and can be used in somewhat the same fashion as the scintillator-pulse height analyzer system described hereinafter. Higher intensity sources and radioisotopes emitting higher energy gammas could be used for greater separations with due regard to radiation hazard. Cs-137 emits a monoenergetic gamma ray of 0.663 mev. with a half-life of 33 years. Radioisotopes emitting at least about 300 kev. gamma rays and above about 2 millicuries in intensity are generally useful herein. Co-60 and Sr-90, among others, may be so employed. A Cs-137 source doubly encapsulated, e.g., in Monel metal alloy, may have a length of about 4 or 5 mm. and a diameter of about 2 mm. to provide what can, for present purposes, be considered to be a point source.

The source 11 and detector 12 are preferably arranged as in a dual probe assembly to maintain the necessary spatial relationship and facilitate manipulation. In the embodiment of FIGURE 1, detector 12 may be attached with the source 11 and crystal or other detector element at the lower ends of parallel support rod members 16 and 17, at a common transverse level, respectively. The upper ends of said rods may then be provided with a support yoke 18 constructed, for example, as a pair of tranverse framework members 18, 21 secured to said upper rod ends with cross bracing members 22, 23, providing alignment and spacing rigidity.

For permanent or semi-permanent installation, parallel access tubes 26, 27 of thin low Z material, e.g., about 0.05 to 0.2 wall thickness aluminum, laminated fiber glass, etc., may be mounted prior to snowfall by embedding the lower ends in stable sockets in soil 30; however, a concrete foundation (not shown) or the like may be used. In portable operation or otherwise, after snowfall has occcured, clearance size parallel cores of the snow deposit 28 may be removed and tubes 22, 27 inserted in snow-supported standing relation. The source 11 and detector 12 of the probe assembly can thereby be inserted to travel up and down in fixed spaced transverse coplanar relation to traverse successive transverse segments or increments of snow 28 therebetween.

While such movement may be effected manually, it is preferred to utilize powered means to effect such movement. In the arrangement shown in FIGURE 1, a simple crane or the equivalent may be utilized. For example, a tower 29 spaced from tubes 26, 27 may be provided with an arm 31 extending thereover. The lift element of said crane may be provided as a cable 32 extending from an electric motor-driven winch 33 mounted on tower 29, carried by pulleys 34 on arm 31, which cable may be attached by cable yoke 36 to support yoke 18. Caps 35 may be used to prevent snow from entering said tubes, but permit free movement of rods 16, 17. The cable is arranged on the drum of winch 33 so as to be wound at constant speed to provide for a constant traversing speed of movement of the probe assembly. The electric winch can be actuated manually, by time control or telemetry. Limit switches or a control (not shown) actuated by distinctive variations in the count rate at air-snow or snow-soil interface can be used to terminate travel or recycle the various operations.

Radiation, i.e., gamma radiation, traveling substantially along the direct narrowly defined path 37, e.g., of the order of 0.5-inch thicnkess and 1.5-inch width corresponding to the thickness of the sodium iodide crystal described above, provides the most accurate measure. The portion of the radiation traveling along an indirect path, e.g., path 39, being scattered and moderated to lower energy before entering said crystal provides a count that varies in a complex manner related to density which is therefore difficult to relate to density in a single direct measurement. Also, since the photons of such indirect path radiation of degraded energy also traverses a shorter path in the crystal, the impingement of such indirect path gamma photons yields a reduced light pulse from the crystal and a correlatively low electrical pulse output from the counter 12, as compared to the direct path radiation.

With the foregoing in mind, the electrical output pulses from counter 12 are conducted along cable 41 to a pulse height analyzer 42 which is set or calibrated to select and pass electrical pulses corresponding to the photo peak produced by said direct path gamma photons, while heavily discriminating against or eliminating counts produced by indirect path radiation. These direct path photons are those originally directed along path 37 from source 11, but which have not been scattered from said direct incremental path 37, and the number thereof is most precisely proportional to the density, i.e., the amount of water interposed along the volume of path 37. For density profile or even for fixed position density determinations, the pulses corresponding to unscattered direct path gamma photons are fed from analyzer 42 of conventional design (e.g., Troxler Laboratory E–200 pulse height analyzer) to a scaler ratemeter 43 of conventional design (e.g., Troxler Laboratory Model 200–B SL), and thence to an amplifier-analog chart recorder 44 combination of standard art design. For precise counting and calibration, a scaler is substituted for the ratemeter, amplifier/chart recorder, and pulses are counted for selected set periods of time. The electronic equipment disclosed above can be housed in a shelter 45 for protection.

Figures 1, 2:
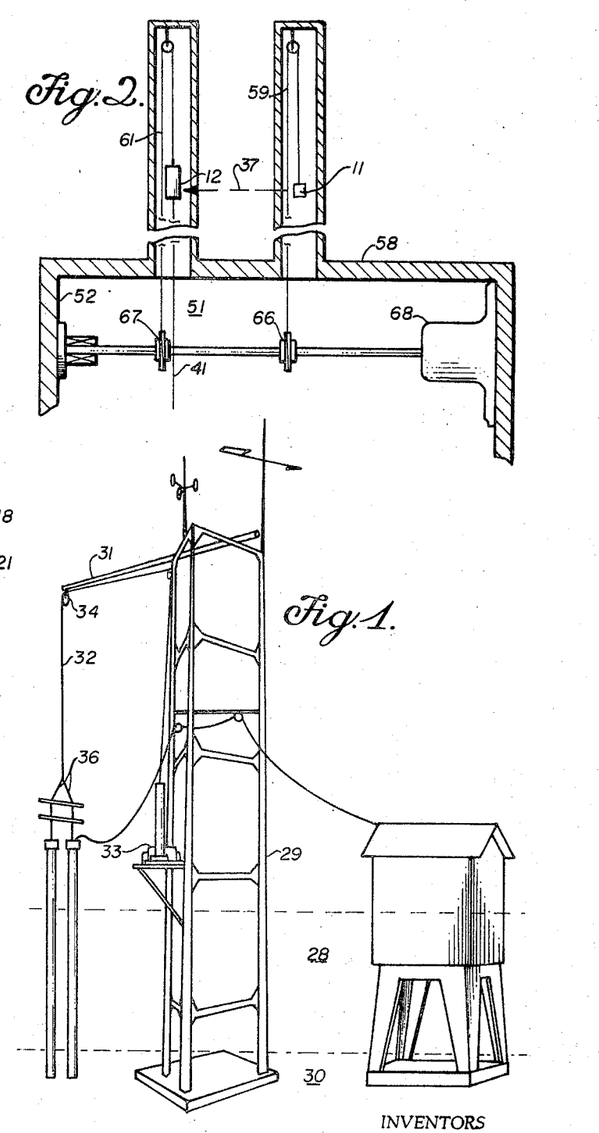

A second embodiment of a traversing dual probe arrangement adapted for permanent installation is shown in FIGURE 2 of the drawing, wherein components similar to those of the first embodiment are indicated by similar reference characters. As illustrated therein, a chamber 51 provided with an access port (not shown) and defined, e.g., by concrete wall 52, is constructed below the surface level of soil or rock 53. Closed upper end traverse tubes 56, 57 are secured in perforations in the roof 58 of chamber wall 52 to extend in parallel spaced relation upwardly through snow deposit 28. Means are provided for supporting and moving the radioisotope source 11 and radiation detector 12 as above. One such means may comprise tapes or cables 59, 61 passing over pulleys 62, 63 respectively, and attached at one end to source 11 and detector 12, respectively. The other end of tapes 59, 61 may be secured to reels 66, 67, respectively, which are carried for simultaneous rotation by a steel bearing supported shaft driven at constant selected speed by motor 68. Associated electronic equipment similar to that above (not shown) may then be disposed in chamber 51. It will be noted that such an installation is weatherproof and suitable for permanent installation. Also, the electronic components, etc., are disposed in a relatively constant temperature environment. Other equipment means, e.g., racks and pinions, etc., may be used similarly to effect uniform spaced simultaneous travel of the source 11 and detector 12.

Typical examples of the operation and use of apparatus corresponding to said first embodiment and also applicable to said second and third embodiments are presented hereinafter.

One device, generally corresponding to the dual probe arrangement of the first of the aforesaid embodiments, for measuring 0.5-inch thick incremental snow layers lying between vertical access tubes included a 5-millicurie cesium-137 radioisotope gamma radiation source 11 disposed in a 0.75-inch diameter access thin aluminum tube 26. The source was cylindrical over-all of about 2 mm. diameter and 4–5 mm. length. The detector 12 comprised a thallium-activated sodium iodide crystal in the form of a circular disk 0.5 inch thick and 1.5 inch diameter disposed transversely in a housing 13 of approximately 1.75 inch outside diameter with a photomultiplier tube and preamplifier as in conventional practice. The detector (e.g., a Troxler Laboratory Model 300 scintillation detector) was disposed in sliding relation in an access tube 27 of about 1.9 inch internal diameter, 2-inch O.D. A 12-inch spacing, center-to-center, between access tubes was typically used.

In operation, the probes are positioned in the access tubes which are positioned parallel to one another in the snow-pack. Gamma photons emerge from the radioactive source, uniformly in all directions. Those which reach the crystal detector-photomultiplier create an impulse, the amplitude of which is proportional to the energy of the gamma photons received by the detector. To eliminate counts corresponding to the lower energy photons arriving by an indirect path, there is used a pulse height analyzer which discriminates against low energy, i.e., scattered photons. Only non-scattered photons which have traveled in a straight line from radioactive source to the detector without collision are considered in the density measurements. The number of these non-scattered photons received is proportional to the density of moisture in the volume of the material being studied. The electrical pulses corresponding to the unscattered photons are received by a ratemeter whose output is fed through an amplifier to an analog chart recorder 44. For precise counting and calibration, a scaler is substituted for the ratemeter, amplifier and chart recorder. In this case, impulses are counted for definite time intervals and are tabulated.

The complete system can be made highly portable. In its most simple form, without the chart recorder, it weighs about 60 pounds, is portable, self-contained and of modular construction. Thus, packaged circuitry can be substituted in the field in the event of equipment breakdown. The equipment is then reasonably waterproof and operates over a temperature range of −23° C. to 60° C. The scaler may have a built-in ratemeter for scanning of the cesium-137 spectrum in setting the pulse height analyzer. The system may operate from standard AC sources or from included, rechargable batteries.

Figure 8:
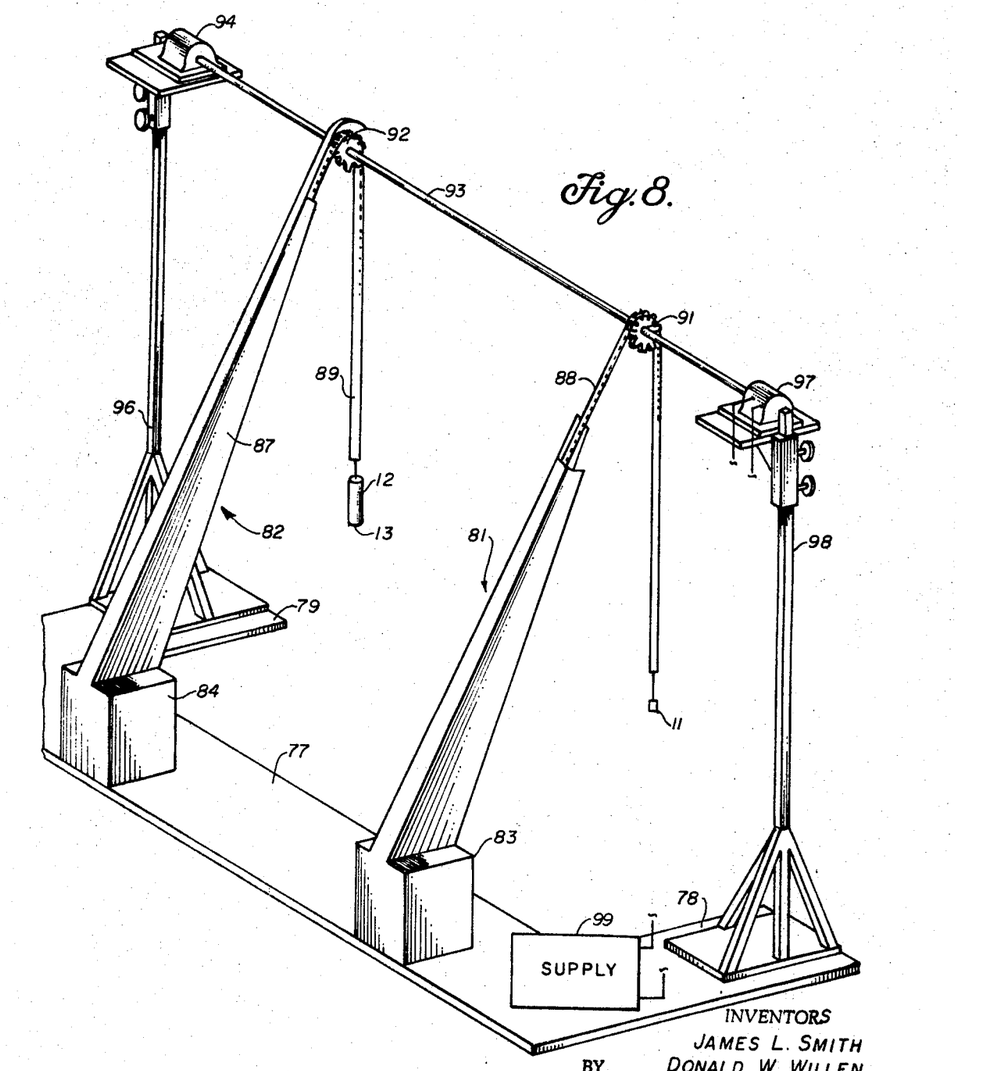
FIGURE 8 is an illustration of a portable embodiment of the invention.

More particularly, a portable or semi-portable traversing system may be provided similarly to the embodiment shown in FIGURE 8 of the drawing. For support, a U-shaped base 76 having a cross member 77 and arms 78–79 may be provided to rest on snow or other surface (not shown). A pair of housings 81, 82 having lower enlarged portions 83, 84 and upwardly slanting column portions 86, 87, respectively, may be mounted on cross member 77 of base 76. Retractable reels (not shown) or similar winding devices are disposed in housing portions with one end of perforated tapes 88, 89 wound thereon. The tapes 88, 89 extend upwardly through columns 86, 87, respectively, and pass over sprocket wheels 91, 92, respectively, to depend downwardly in parallel relation to support source 11 and detector 12 in the parallel spaced relation mentioned above. Sprockets 91, 92 are mounted in fixed relation as on a shaft 93 to assure parallel positioning of the tapes, detector and source. The shaft 93 is carried at one end by a bearing 94 supported by a tripod stanchion 96 resting on base arm 79, and is supported, coupled to and driven by a gear reduction motor 97 supported by tripod stanchion 98 resting on arm 78 of base 76. Power supply 99 is employed to actuate motor 97. It will be observed that the upper ends of housing portions 86, 87 can be extended to enclose sprockets 91, 92 to serve as a weatherproofing enclosure for the tape reel and actuating medium. Also, the housings can support bearing 94 and motor 97 if the housings are attached firmly to base member 77 or otherwise are made self-supporting. The cable (not shown) leading from detector 12 may be run parallel to tape 89 for upward and downward motion in wells (not shown) provided as above.

The system was calibrated by inserting known quantities of snow between the source and detector and determining the count rate. It was checked by determining count rate for natural snowpacks into which the access tubes had been placed. Snow was then removed from each counting layer and weighed for density determination.

Figure 3:
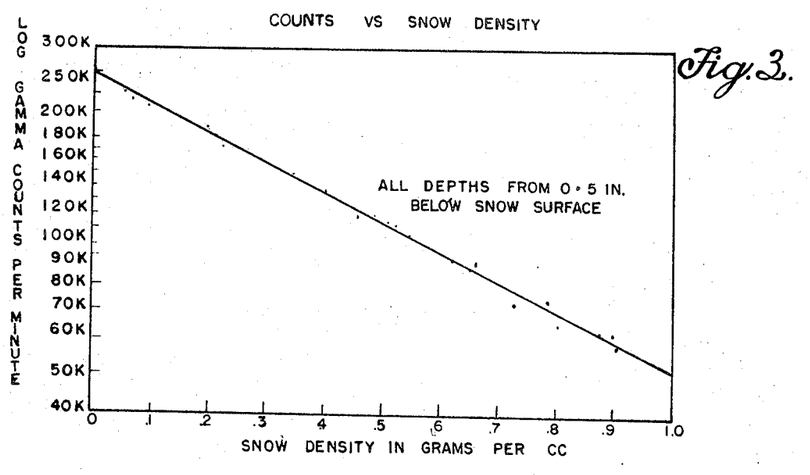
FIGURE 3 is a graphical calibration curve for a specific embodiment of a gage in which the ordinate is the natural log of gamma counts per minute and the abscissa is the density of snow (water content) in grams per cc.

The calibration data (counts per minute) was transformed into natural logarithms and a logarithmic regression solved for the data. This followed the relationship: snow density=8.0—0.64 (log counts). The associated means is 0.512, standard deviation from the mean is 0.298, the standard error of the regression is 0.012 and the coefficient of variation ($R^2$) is 0.998. The gamma transmission scintillation snow gage can be used to measure snow density to within ±1.2 percent or better of actual snow density. Only one calibration curve is needed, since one may measure snow within ½ inch of an interface, as illustrated in FIGURE 3.

Figure 4:
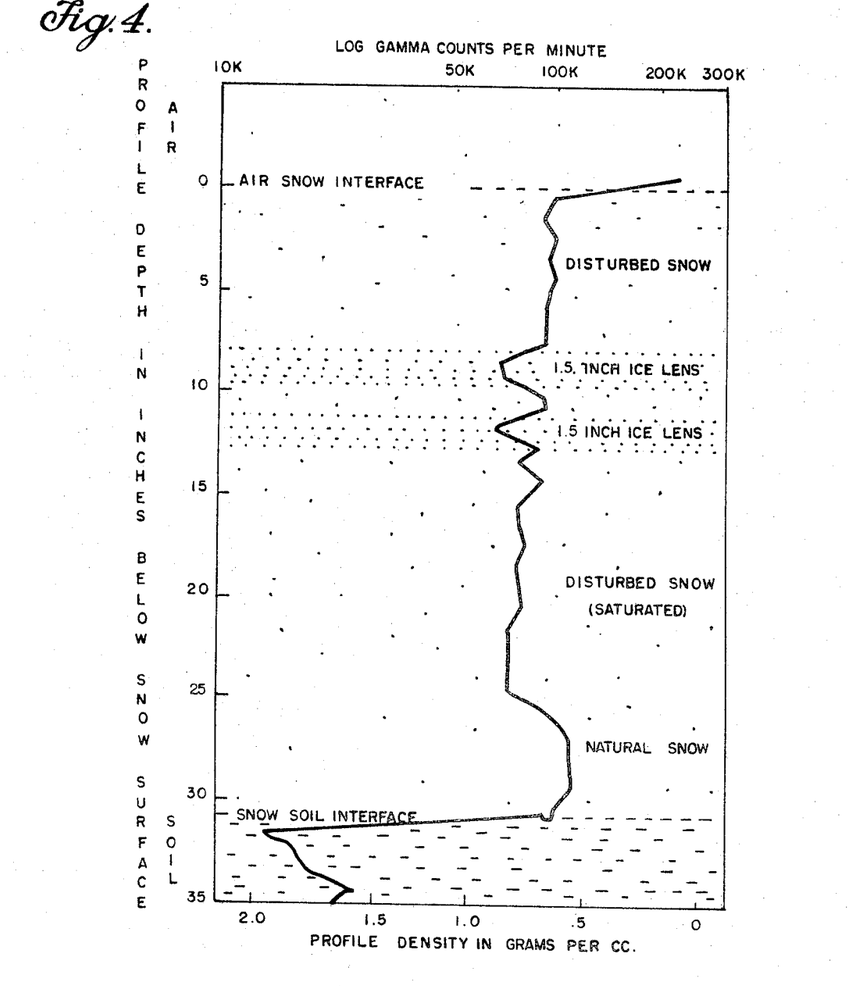
FIGURE 4 is a graphical representation of the natural logarithm of gamma counts corresponding to density variations (abscissa) related to depth (ordinate) in inches as a profile of a typical snowpack.

The system was manually tested for its ability to detect density changes within a snowpack. A natural snowpack was excavated and repacked with known snow densities. One minute counts were at intervals of 1 inch, except when approaching or leaving a zone of density change. At such points, counts were made in ½-inch intervals with results presented in FIGURE 4. Examination of FIGURE 4 shows that the system does detect density changes in ½-inch intervals. The gage-measured densities and the gravimetrically-determined densities were within 1 to 2 percent of one another.

Figure 5:
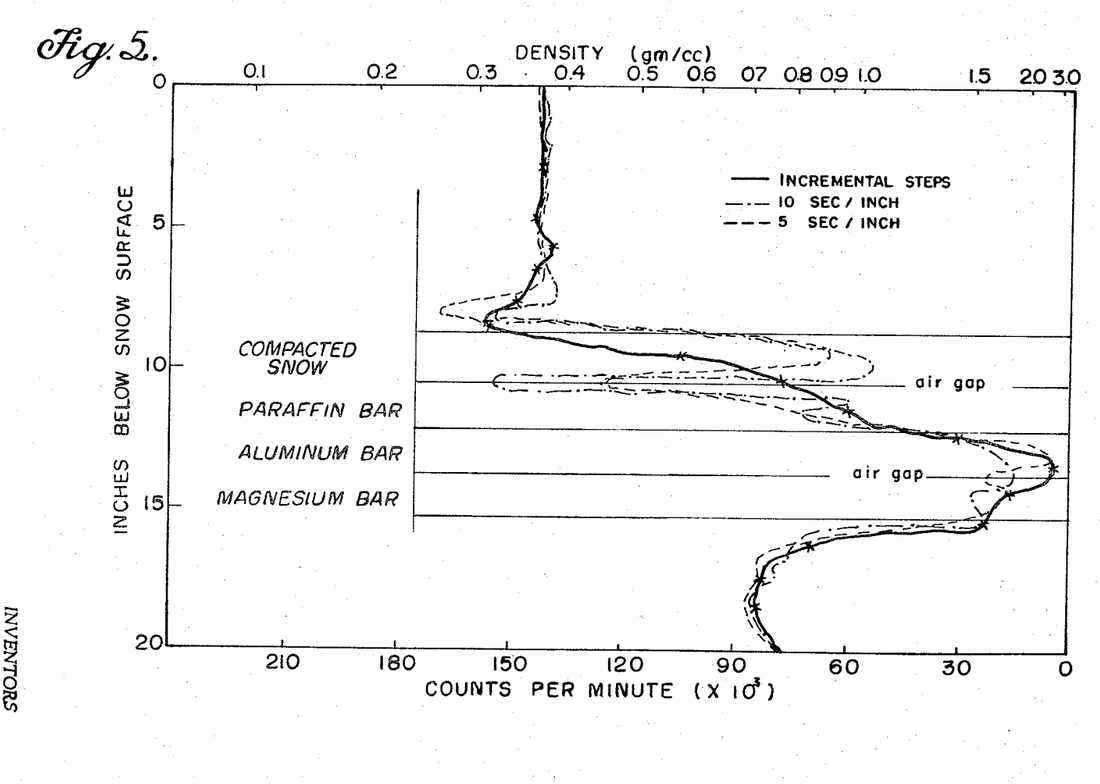
FIGURE 5 is a graphical representation comparing profiles obtained utilizing the continuous progressive incremental scaler scanning procedure as compared to a multiple fixed position ratemeter scanning procedure of an artificial varying moisture content profile.
Figure 6:
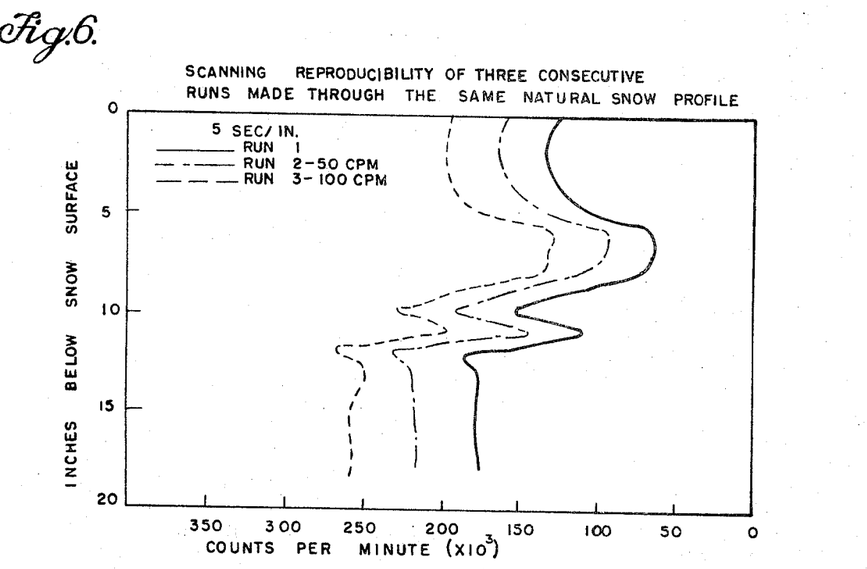
FIGURE 6 is a graphical representation of scanning traverse reproducibility in consecutive runs with data displaced by successive 50 count distances to facilitate comparison.

The system was manually tested as a constantly moving profiling snow gage. A snowpack having a natural profile with included lenses of materials having varying densities was profiled by three methods. First, a point-by-point survey of the profile was made by taking counts at 1-inch intervals. Second, the source and detector were simultaneously lowered through the snowpack at a speed of 10 seconds per inch. Third, they were lowered at a speed of five seconds per inch (FIGURE 5). Repeat runs at the same speed resulted in curves of almost exactly the same magnitude in every sector of the curves, although the source and detector were lowered by hand and timed with a stopwatch (FIGURE 6). The five second-per-inch profile rate resulted in a curve more accurate than even the point-by-point survey. At this rate of movement, a 10-foot deep snowpack can be profiled in 10 minutes, and it can easily be profiled as often as needed.

The ability of the system to detect water movement either from snowmelt or from a rain-on-snow event was determined by placing the source and detector at a common depth in a snowpack and spraying water onto the snow surface. The resulting variation of density with time was plotted. The system detected the wetting front when it reached the source detector horizon. The density increased in response to the new water in the pack and remained constant until cessation of water application. The pack then drained to a lower density. The system accurately recorded the pack performance. This snow gage may therefore be used as an automated, telemetered high elevation "snow sentinel" of snowpack performance during snowmelt. Melt may occur in response to warm ambient air temperature or as the result of rain-on-snow.

Most isotope snow gages have used Geiger-Mueller detectors to avoid temperature-caused problems. The scintillation detector is temperature sensitive. As the temperature of the detector increases, so does the count. This change will cause the pulse height analyzer to shift off the photopeak or other setting. If the system is used in one place, temperature changes cause little difficulty because the detector is in the snow at all times and subject to only small temperature changes. These can be controlled by occasional setting of the "window," i.e., the selected pulse height range in the pulse height analyzer.

If the system is to be used in many places in a day, temperature changes pose a problem. In such a case, the detector will heat up while out of the snow and cool off inside the pack. The problem can be handled in two ways. The detector can be cased in an insulated jacket and it can be carried from location to location in an insulated carrying case. Normal elctronic drifting of pulse height analyzer circuits also necessitates resetting the "window" several times each day. The most logical solution to electronic drift and to count change due to temperature effects on the detector consists of using a "peak stabilized pulse height analyzer." This peak stabilized pulse height analyzer will eliminate count shifts due to electronic or temperature causes. A pancake type Geiger-Mueller tube detector can be used, e.g., to profile a snowpack in 2-inch vertical increments as mentioned above; however, its sensitivity is far less than that of the scintillation detector so that longer traverse times or longer radioisotope sources must be used. Also since the Gieger-Mueller tube does not yield pulses correlated to energy of the photon, other means such as the inherent discrimination therein must be used in the place of the pulse height analyzer.

Since the time of earliest experience with tests using gamma isotopes to measure snow density, there have been recurrent published observations and speculations that errors in calibration and measurement might have been due to different attenuation properties of snow, ice and fluid water-forms. However, it does not seem reasonable to assume that a "hard" gamma, such as that from cesium-137, would be materially affected by changing water into ice. It appears more likely that erroneous observations have resulted from electronic drift caused by using laboratory equipment under field conditions.

Figure 7:
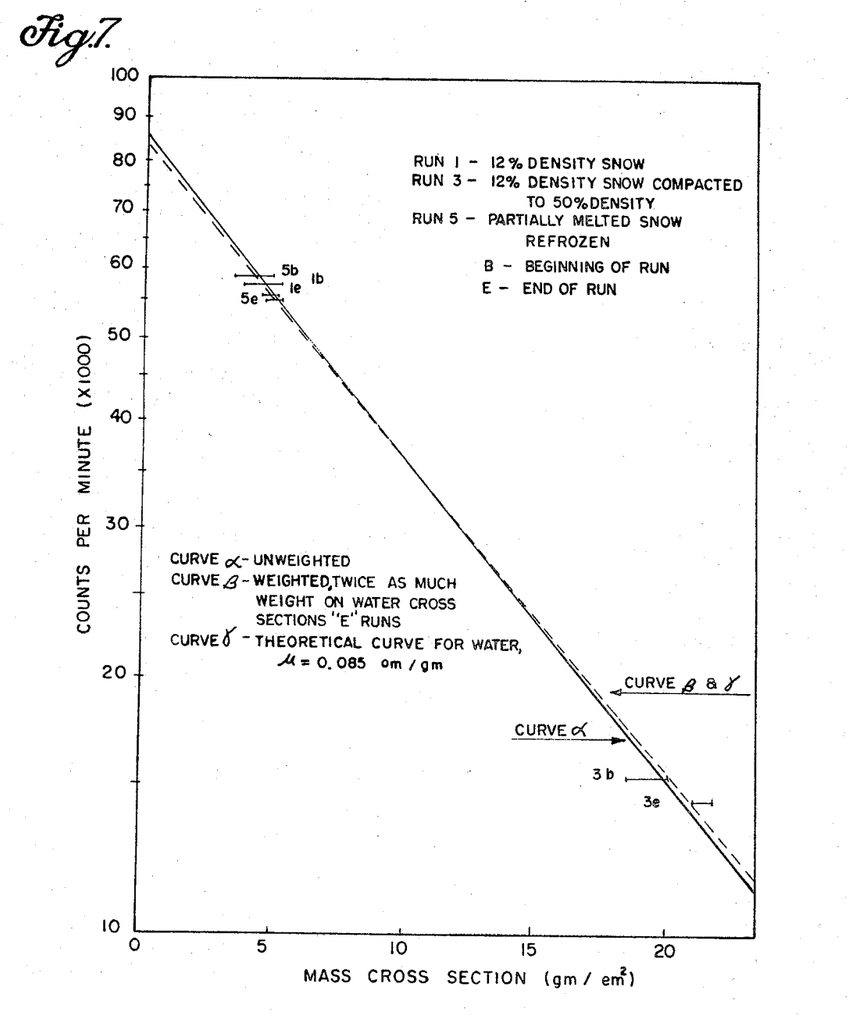
FIGURE 7 is a graphical illustration of gamma counts per minute vs. mass cross section of various forms of water illustrating constancy of counting regardless of such form.

To measure the effect of crystal structure upon gamma attenuation, water, snow and ice samples from the same source were exposed to cesium-137 gamma radiation in a constant geometry set-up. A scintillation detector on the opposite side of the sample detected the gamma photons. The output was received by a multi-channel pulse height analyzer and the detected photons of the cesium-137 spectrum was printed out. Counts were integrated under the full width of the peak and the count per minute obtained. Mass cross section of the samples was plotted as a function of counts per minute and a curve fitted to the data. The curves for snow and for ice were compared to that obtained when water alone was used. The mass attenuation coefficient was equal to the slope of the curve; thus a difference in attenuation would be indicated by a difference in the slope of the two curves. When the mass cross section versus counts per minute were plotted, the slope of the regression lines for snow, ice, and water samples was not found to be significantly different beyond the 1 percent level from one another, as shown in FIGURE 7. Thus, for all practical purposes, the attenuation for water is constant in the solid, particulate and liquid states and is always correlated with the amount not the form of the water in the path being surveyed.

Melt of snow around access tubes becomes a problem if melt progresses to the point where it affects the estimate of snow density between the access tubes, i.e., if spaces open up. The closer the spacing of the tubes the more critical the melt becomes. Experiments with use of expanded polystyrene as insulation around the aluminum access tubes showed that heat transfer along the tube could be minimized and resultant snowmelt around the tube reduced to acceptable levels. The most suitable tubing would be one consisting of an aluminum tube for strength, surrounded by 1 to 1½ inches of white, e.g., foamed polystyrene insulation. Further we have found that sun-cupping can be practically eliminated by spraying the snow surface with an evaporation suppressant compound, e.g., hexadecanol. Spacing studies showed that access tubes can be separated 24 inches, center to center, and still retain good counting statistics while using a 5 millicurie cesium-137 source.

The source and detector probes were also raised and lowered by an overhead pulley system powered by a reversible electric motor, as shown in FIGURE 1. Under these conditions the profiling speed was five seconds per inch. The time constant for both ratemeter and chart recorder was set at five seconds and the output from the ratemeter was plotted directly onto an analog chart recorder. Accuracy of the measurements is within 2 percent of actual density. It will be appreciated that other profiling speeds can be used, dependent on source intensity, tube spacing, electronic sensitivity and the like.

An exposed overhead suspended pulley system for raising and lowering the source and detector can be used for snow research purposes. It is not recommended for operational field use since difficulty will be experienced in that the detector source cannot be easily raised or lowered during heavy winds. It can be operated during rains provided a "sock," i.e., flexible polyethylene is fastened over the access tubes to keep water out of the tubes, or the embodiment of FIGURE 2 can be used.

A remotely operating, telemetered snow gage will comprise access tubes capped at their tops to prevent entry of water, and the tubes may be filled with a dry inert gas to prevent condensation. The probes may be raised and lowered from below the soil surface. The electronic equipment may then be housed in an insulated, waterproof box. Electricity to operate the system can be supplied by an LPG, i.e., propane-fed bottle gas thermoelectric generator or from line voltage if it is close at hand. In remote locations, the heat from the generator can be used to keep the electronics at an optimum temperature.

The detector in the remotely operating unit will preferably be a sodium iodide crystal scintillation unit, and the signal will be fed to a peak-stabilized pulse height analyzer, a ratemeter, a digital volt-meter, and, e.g., a telephone data phone set. The data may be telemetered over a phone line or by radio. High speed transmission may be obtained by adding a tape recorder to the package.

At the receiving office, the incoming signal will enter a data phone set and thence go to either a computer or a print out unit.

The gage of the invention could form the core of a snow research program. In snow hydrology, in glacier research, and in avalanche research, the system should find extensive use. Here then is an instrument with which one may survey repeatedly the same profile in a snowpack and determine density to as small vertical increments as is desired. Profiles under different conditions and on various aspects of the snow deposit may be repeatedly surveyed and their performance related to causative stimuli. Snowmelt may be studied and the movement of water within a pack may then be traced.

In operational snow hydrology, i.e., snow surveying, the gage can be a valuable addition to the surveyor's bag of tools. With the gage operating as a "snow sentinel" in headwater locations, actual water content, snow depth and density changes within the pack can be determined as often as desired. Relations between melt at a central location and other cover-aspect conditions nearby may be determined and melt for large areas predicted from performance of the snow at the gate site. Expressed mathematically this data can be programmed for a computer. Then by feeding in day-to-day melt from the "snow sentinel," one may predict actual melt and subsequent streamflow. By relating current internal pack structure to predicted weather, short-range melt forecasting should be possible.

Current flood warning systems depend upon stream gages to warn of rising streams. One of the greatest uses to which the snow gage could be put would be that of a "snow sentinel" during rain-on-snow storms. In a rain-on-snow situation, the density of the various horizons within a snowpack may be determined throughout the storm from a rain gage. The snowpack may be profiled at intervals throughout the storm. From each profile run, one may determine the snowpack depth, density of each layer, and total water content of the pack. From a knowledge of the incremental rainfall amounts, and the amount stored in the snowpack, one can determine how much of the incoming rain is being stored in the pack and how much is being released to the soil or as overland flow.

If the access tubes extend into the soil, the same system can be used to measure soil moisture and the water balance extended to take into account the water loss to the soil. As the snowpack begins to melt, it becomes more shallow. This depth decrease can be measured with each profile run.

If rainfall ceases during a storm and snow begins to fall, this change will be reflected in the pack performance by water draining from the pack. The loss of water causes a reduction of the abnormally high densities experienced with free water in the pack. Further, the depth of the snow pack begins to increase as new snow falls, all of which would be detectable utilizing equipment disclosed above.

While there has been described what may be considered to be preferred embodiments of the invention, modifications can be made therein without departing from the teachings of the invention, and it is intended to cover all such as fall within the scope of the appended claims.

What is claimed is:

1. In a gage device for measuring distributed variable water densities in a solid deposit, the combination comprising:
   (a) radioisotope source means emitting gamma radiation photons of characteristic photopeak energy;
   (b) detector means adapted for intercepting said gamma radiation photons emitted by said source;
   (c) assembly support and traverse means including probes carried by rigid support structure in parallel alignment for supporting said source and detector in fixed spaced relation, and including means for moving said probes together with said source and detector supported thereon simultaneously and continuously at a constant rate along generally parallel open paths in said deposit so that photons from said source traverse successive narrowly defined incremental volume portions of said deposit and are intercepted by said detector;
   (d) means including a pulse height analyzer coupled to said detector means for selecting counts produced by photons of said photopeak energy traveling directly along said narrowly defined incremental volume of said deposit, whereat the number of detected selected counts in a selected period of time vary inversely in a simple relation in proportion to the water content density in said volume; and
   (e) means displaying the number of said selected counts in a selected time period as a measure of said water content density in said incremental deposit volume.

2. Apparatus as defined in claim 1 wherein said radioisotope source is a substantially point source means and said detector means is a detector having a sensor of narrow dimension thereby defining said narrowly defined incremental volume portions of said deposit directly between said source and detector.

3. Apparatus as defined in claim 1, wherein said parallel paths along which said probes are moved are defined by thin tubular radiation pervious access tubes held in fixed parallel spaced relation.

4. Apparatus as defined in claim 3, wherein said means for moving said probes comprises crane means including a cable connected to said assembly support means and extending upwardly to a cable winding mechanism, said cable arranged to be drawn at a constant speed along said access tubes so that said probes traverse successive transverse incremental volumes therebetween at a constant rate of speed.

5. Apparatus as defined in claim 4, wherein said access tubes are closed at the top and mounted over an enclosed shelter, and said support and traverse means comprises members movable longitudinally in said access tubes and attached to said source and detector means, and means are provided in said shelter for actuating said support means in unison longitudinally in said access tubes.

6. Apparatus as defined in claim 2 wherein support and traverse means include tape means having a first end attached to said detector and source, support members adapted to rest in fixed position upon a base and having upwardly slanting beam portions, motor-powered shaft supported sprocket means associated with the upper ends of said beam portions engaging said tape means, and retractable reel means associated with said support members and engaging the second end of said tape means.

7. Apparatus as defined in claim 2, wherein said detector means comprises a generally circular scintillator detector crystal mounted transversely in said access tubes, together with a photomuliplier and associated circuiry for producing output electrical pulses of a pulse height proportional to the energy of gamma ray photons emitted by said source and traversing the space between said source and detector means.

8. Apparatus as defined in claim 7, wherein said means for displaying said selector counts comprises a ratemeter.

9. Apparatus as defined in claim 7, wherein said means for displaying said selected counts include a scaler rate meter converting said counts to an analog output signal coupled to analog chart recorder means.

10. Apparatus as defined in claim 7 where in said source means comprises cesium-137 which emits monoenergetic gamma rays.

References Cited

UNITED STATES PATENTS

| | | |
|---|---|---|
| 2,708,721 | 5/1955 | Ziffer. |
| 2,972,050 | 2/1961 | Allen. |
| 3,007,048 | 10/1961 | Knapp et al. |

OTHER REFERENCES

Gamma Radiation Gauges Snowpack Water Content, by C. Robinson, from Electrical World, Oct. 24, 1960, pp. 82, 83.

ARCHIE R. BORCHELT, *Primary Examiner.*

U.S. Cl. X.R.

250—83.3